Dec. 17, 1929.  E. ZBINDEN  1,739,885
ALTERNATING CURRENT DRIVING DEVICE
Filed June 18, 1925
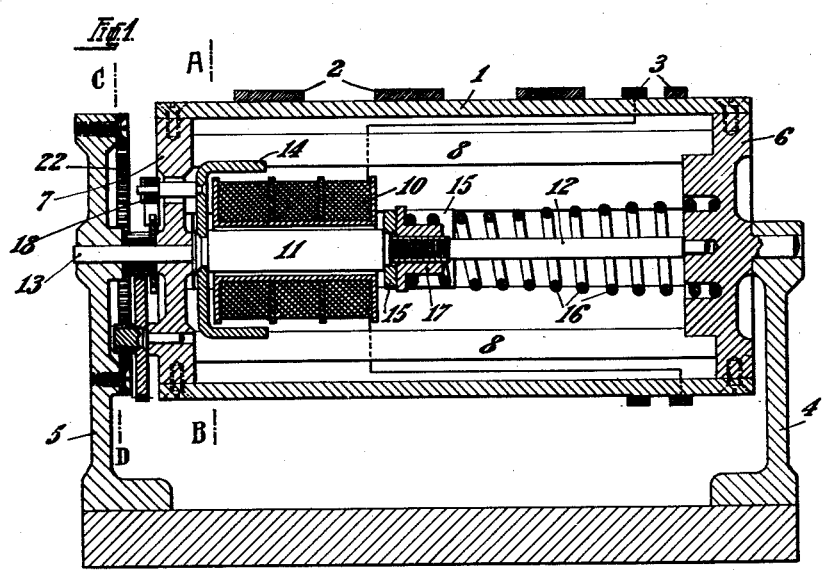
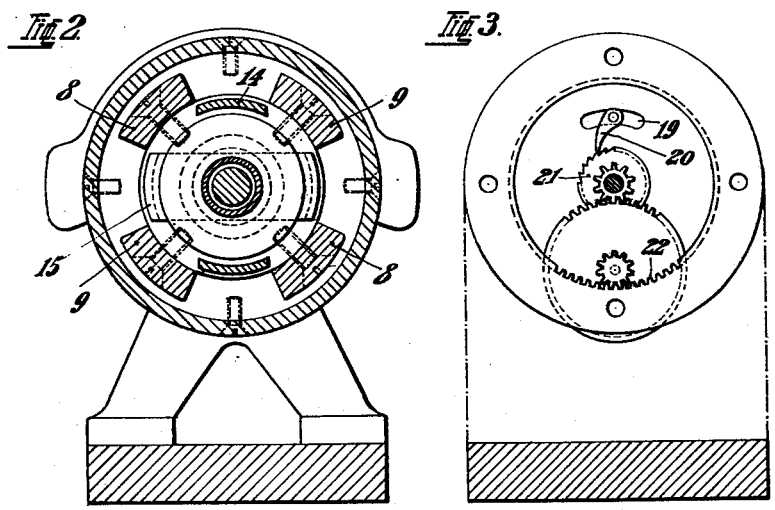
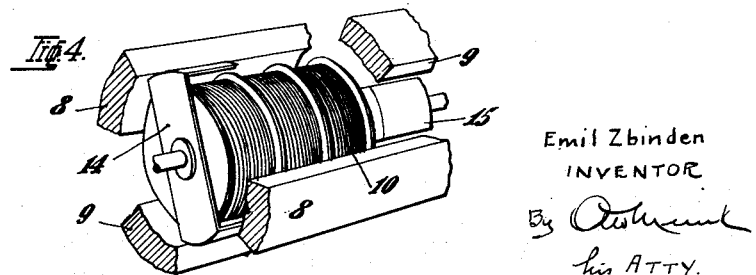
Emil Zbinden
INVENTOR
his ATTY.

Patented Dec. 17, 1929

1,739,885

UNITED STATES PATENT OFFICE

EMIL ZBINDEN, OF SOLOTHURN, SWITZERLAND

ALTERNATING-CURRENT DRIVING DEVICE

Application filed June 18, 1925, Serial No. 37,930, and in Switzerland June 18, 1924.

Alternating-current driving devices are known, in which an armature, arranged in a permanent magnetic field, is caused to oscillate under the influence of a spiral-spring, whose frequency corresponds to the number of cycles of the alternating-current.

In these driving devices the coils, that produce the alternating-current field, are located on the armature and form as a whole the oscillating-system tuned to the period of the alternating-current. The alternating-current passes to the winding of the oscillating armature through flexible connections. If such a driving device is to be adapted to the different line-tensions to be met with in practice, the coils must be wound according to these different voltages, but in so doing it is not possible, to keep the weight of the coils constant, or to employ coils of equal size in all cases. Therefore, these differences must be equalized by a suitable spring or an additional load of the oscillating armature, for which purpose special testing-facilities are necessary.

In lieu of permitting the armature provided with coils to oscillate it was proposed to develop the permanent steel-magnets which generate the constant magnetic field as an oscillating system.

In the first mentioned driving device, the weight of the oscillating armature, increased by the winding, was found to be disadvantageous, as the production of the spring, which was to be tuned to those rapidly oscillating masses, turned out to be difficult and let practically to unfavourable dimensions, in order to avoid over-oscillations in the turns of the spring.

The solution, according to the second proposition, did away with the disadvantage of the unequal armature-weights, but has still the disadvantage of the great flywheel-masses and the difficulty of determining the correct sizes of the spring for higher frequencies.

In order to obtain a fairly powerful driving device, in which the permanent magnets are provided as oscillating members, it is necessary to cause oscillation of permanent magnets having relatively large masses and weights.

With the driving device according to the present invention, the disadvantages mentioned before are avoided. In this driving device permanent magnets for the production of a constant magnetic field and a winding for the production of an alternating magnetic field are mounted relatively immovably, the armature-core being provided with pole-wings and arranged movably within the winding in such a manner that it oscillates with the alternating-current frequency under the influence of the alternating magnetic flux and of a spring tuned to the same frequency.

A particular advantage will be obtained by arranging such a driving-device directly within the switch-drum of an electric switch-apparatus.

In the well-known electric switching-apparatus with motor-drive, the motor takes up a large space, relatively to the remaining part of the apparatus. Such apparatus requires therefore a much larger space than an apparatus of equal power, but without motor-drive, as for example with hand-drive.

By placing the driving-device within the switch-drum of the apparatus, according to the present invention, this waste of space can be avoided and it makes possible the construction and the arrangement of electrical switching-apparatus with motor-drive in a space, not substantially larger than that for an apparatus of equal power with hand-drive.

The arrangement of the driving-motor within the switching-drum has furthermore the following advantages: With increasing power of the energy to be switched in and out, the diameter as well as the length of the switch-drum will naturally be increased in order to obtain the necessary disconnecting spaces and distances between the different phases to be switched in or out. In conformity with this, the inner free space of the switch-drum is enlarged and it can therefore be placed, without difficulty, in a driving-device of greater power, without increasing the switching-apparatus more than necessary for the switching in and out of the provided power.

The larger dimensions of the switch-drum, dependent on the greater power of the switch, are utilized in a suitable manner for the arrangement of the driving-device of corresponding output, resulting in very important savings of material and in the size of the switching apparatus.

This construction, with a correspondingly built driving-motor, is especially adapted for electric oil-break switches, as the switch-drum, together with the enclosed driving-device, can very easily be accommodated in an oiltank, where all parts are protected against dust and dampness and electrically well insulated. The driving of the switch-drum does not require any more or less complicated driving-mechanism, but only one or two control-wires of medium transverse section.

A driving device according to this invention is illustrated by way of example in the accompanying drawing, it being assumed, that the device is placed within the switch-drum of an electric switching-apparatus and is operating it.

Fig. 1 is a longitudinal section through the switch-drum,

Fig. 2 is a section through line A—B Fig. 1,

Fig. 3 is a section through line C—D Fig. 1, and

Fig. 4 a perspective partial view of the device.

In the drawing, the switch-drum 1 is provided, at its circumference with the contacts 2, which by the rotation of the drum make contact temporarily with contact-fingers not shown in the drawing. 3 shows contact-rings, which serve for supplying the alternating-current to the driving-device. The drum 1 rotates in brackets 4 and 5 and is closed at its ends by means of end plates 6 and 7.

To the endplates, are rigidly connected, the ends of four permanent magnets 8 and 9, which are concentrically equidistantly arranged around the axis of the switch-drum. Within the four steel-magnets, the coil 10, that serves for the production of an alternating magnetic field, is fastened (by means not shown in the drawing) immovably, relatively to the magnets and coaxially to the drum 1. It is electrically connected with the contact-rings 3. The armature-core 11 is elongated towards both ends and rotates by means of the extension 12 in the endplate 6 and by means of the extension 13, which passes through the endplate 7, in the bracket 5. At opposite ends of the coil 10, U shaped pole wings 14 and 15 are fixed on the armature-core 11, these wings extending at a right angle to each other. The armature is under the influence of a conical spring 16, one end of which is secured in the endplate 6 and the other end in a nut 17, which serves to lock the polewing 15. The spring 16 has a conical shape, because it has been found, that with such springs over-oscillations can be more easily avoided than with ordinary spiral springs.

With the pole wing 14 is connected a pin 18, that passes through a slot 19 Fig. 3 of the endplate 7 and carries a pawl 20, which cooperates with a ratchet wheel 21. The latter acts upon a planetary train of wheels, that turns around a toothed rim 22 fixed on the bracket 5.

The operation of the device is the following: Assuming the ends of the steelmagnets 8, that are adjacent the endplate 7 to be northpoles, the corresponding ends of the steelmagnets 9 are south-poles. If now an alternating-current flows through coil 10, the pole wings 14 and 15 will be alternately magnetized in an opposite direction and attracted by the opposite poles of the steelmagnets. If the pole wing 14 is a north-pole, the magnets 9 will attract it and at the same time the pole-shoe 15, which is a south-pole, will be attracted by the magnets 8. By reversal of current, 14 will be south-pole and 15 north-pole. The armature must therefore perform an oscillating movement, synchronous to the alternating-current frequency, under the influence of the magnetic flux changing with the periodicity of the alternating-current, whereby the amplitude of the armature reaches very rapidly its normal value. The spring 16 is such, that the number of natural vibrations of the movable system is somewhat smaller than the frequency of the alternating-current.

In the driving-device described above, the armature-core can be made very light and always of uniform weight. It is therefore possible, to tune this light, oscillating part, without special arrangements by means of a spring made of wire of relatively small section, especially for higher frequencies.

This advantage is important not only in the manufacture of the driving-device, but particularly for existing apparatus, in which the alternating-current coils are to be replaced because of a change in the working voltage or a defective winding. In such a case, no new tuning of the oscillating part is necessary after the new winding has been put in place, although the latter may differ in weight and size from the former winding and the replacement of the winding can be done easily and without special testing-connections by unskilled workmen.

The alternating-current winding of the device is furthermore superior to the well known construction, in which the winding moves with the oscillating part, as far as the security of service is concerned. The flexible connecting wires are dispensed with and the immovable winding facilitates the connections in series, parallel or series-parallel of single groups of coils (in cases where it is desirable to employ a plurality of coils instead of a single one), so that it is possible to use one and the same apparatus for different working voltages. In the described device not only the core and the coil are separated from each other in order to diminish the oscillating masses, but as distinguished from the well-known constructions, the core is arranged in such a manner, that the moment of inertia of the oscillating part is reduced to a minimum. Therefore the value of the arc of oscillation, on variations of the number of periods, varies in a very small degree.

In addition to the already mentioned advantages, this driving-device has the further distinctive feature, that it can be designed so, as to fit in a space with very limited dimensions. With several magnet poles arranged in a circle and with an armature accordingly constructed, a much greater power of the driving device may be obtained with a relatively small increase of the space required.

I claim:

1. An oscillating synchronous motor, comprising a coil adapted to be traversed by alternating electric current, a core rotatable about its longitudinal axis and extending through said coil, pole wings for the coil carried by said core, a spring engaging one of said pole wings, said spring being tuned to the frequency of the alternating current traversing the coil and adapted to regulate the movements of the oscillating system, and a plurality of permanent magnets spaced about said several parts.

2. An oscillatory synchronous motor, comprising a coil adapted to be traversed by alternating electric current, a rotatable core extending through said coil, pole wings carried by said core at opposite ends of said coil, said pole wings extending at substantially a right angle to each other, a spring acting against one of said pole wings, said spring being tuned to the frequency of the alternating current traversing the coil and adapted to regulate the movements of the oscillating system, and a plurality of permanent magnets spaced about said several parts.

3. An oscillatory synchronous motor, comprising end plates, a plurality of permanent magnets having their opposite ends bearing in said plates, a coil adapted to receive alternating electric current and supported adjacent one end plate in fixed relation to the permanent magnets, a core extending through said coil, pole wings carried by said coil, and a spring having one end acting against one of the pole wings and the other end engaging the end plate opposite that adjacent which the coil is supported, said spring and the oscillatory parts of the motor being tuned to such frequency that the natural frequency of the entire oscillatory system is somewhat less than the frequency of the alternating current traversing said coil.

Signed at Berne this 4th June 1925.

EMIL ZBINDEN.